United States Patent [19]

Suga et al.

[11] Patent Number: 4,983,892

[45] Date of Patent: Jan. 8, 1991

[54] MECHANISM FOR CONTROLLING ELECTRICALLY DRIVEN ANTENNA

[75] Inventors: Mitsuhiro Suga, Ageo; Akio Takizawa, Tokyo, both of Japan

[73] Assignee: Nippon Antenna Co., Ltd., Tokyo, Japan

[21] Appl. No.: 254,778

[22] PCT Filed: Jan. 14, 1987

[86] PCT No.: PCT/JP87/00020

§ 371 Date: Jul. 18, 1988

§ 102(e) Date: Jul. 18, 1988

[87] PCT Pub. No.: WO87/04567

PCT Pub. Date: Jul. 30, 1987

[30] Foreign Application Priority Data

Jan. 16, 1987 [JP] Japan .................................. 61-4897
Apr. 11, 1987 [JP] Japan .................................. 61-82329
Dec. 12, 1987 [JP] Japan .................................. 61-190486[U]

[51] Int. Cl.⁵ ............................................ G05B 1/06

[52] U.S. Cl. ...................................... 318/98; 318/266; 318/286; 318/468

[58] Field of Search ................ 318/98, 264, 265, 266, 318/267, 286, 446, 466, 467, 468; 343/715, 903

[56] References Cited

U.S. PATENT DOCUMENTS 4,203,059 5/1980 Kraus .................................. 318/446
4,338,552 7/1982 Pilz et al. .......................... 318/286 X
4,514,670 4/1985 Fassel et al. ...................... 318/266 X

FOREIGN PATENT DOCUMENTS 3305770 8/1984 Fed. Rep. of Germany ...... 318/283

*Primary Examiner*—Bentsu Ro

[57] ABSTRACT

A control apparatus is placed in a drive circuit of a motor of an electrically driven antenna. The drive circuit is provided in parallel with a transmitter-receiver circuit of a transmitter-receiver, and an operation unit is provided so that control instruction can be given by manual operation to a control apparatus. The electrically driven antenna is extended or contracted by an amount determined by the instruction that is given from an operation unit interlocked with a turn-on or off of the power source of a transmitter-receiver. The control apparatus includes, for example, switch plates which are moved by a small motor. Variable contact pieces for the switch plates are adjusted by a manual operation unit to obtain a suitable control instruction through mechanical operation. Alternatively, the control apparatus can be operated electrically by using a control circuit and operation unit. The control apparatus can be placed inside and mounted on a car, and the amount of extension or contraction of the antenna can, selected as is necessary, by the operation unit.

7 Claims, 12 Drawing Sheets

MECHANISM FOR CONTROLLING ELECTRICALLY DRIVEN ANTENNA

DESCRIPTION

1. Technical Field

This invention relates to a mechanism for controlling an electrically driven antenna. A motorized antenna control mechanism automatically extends and contracts an antenna connected to a wireless or radio receiver and transmitter installed in an automobile. A mechanism for controlling the electrically driven antenna is operatively connected with the function of ON/OFF functions of the wireless or radio receiver as to freely extend and contract the antenna.

According to the present invention, simplicity of construction, is achieved, for example, by having a drive motor for a motorized connection driven by a two-wire connection. Also the device is relatively easy to install to the car body without any adverse effects of humidity, dust, and temperature condition or the like. Also mechanism does not suffer from effects of problems of the antenna, such as abnormal efficiency and deterioration of the power source.

2. Background Art

It is known that there are motorized antenna devices retractable by means of a driving device, such as a motor. According to the conventional motorized antenna device the antenna is actuated through a change-over switch situated in a motor vehicle interior. The switch is separate from the switch of a radio receiver, so that a power source is connected to the motor of the antenna.

In recent improved antenna devices, there are limit switches operate in response to the extension and retraction movements of the drive mechanism of the device. The extension and retraction movements of the device can be started automatically by ON-OFF operation of a radio equipped in a motor vehicle.

According to the prior art, a means other than that for operating the transmitter/receiver is used. A change over switch is placed in the car interior to which switch a power-to-motor supply cord of the motorized antenna and the changeover switch is operated in manual. Also a limit switch operated by rotation of the motorized antenna drive portion had been built-in the drive portion. The mechanical conventional motorized antenna portions automatically extend and contract by ON/-OFF operation of the radio apparatus and stop by means of limit switches. The prior art is descrived, for example, in Japanese documents, Utility Model Publication Sho. No. 43-17546, Utility Model laid-open Sho. No. 50-54038, Utility Model laid-open Sho. No. 56-74505, and Patent Publication Sho. No. 60-57242.

Japanese Documents, Utility Model laid-open Sho. Nos. 49-145544 and 57-171336 disclose obtaining pulse signals from a motorized antenna drive portion which is controlled automatically by an electronic circuit which in controlled in time and leg function of extending and extracting by means of a built-in timer circuit.

In every mechanism of the above-mentioned prior art, a control mechanism is installed in the antenna drive portion or integrated in the motorized antenna. Accordingly, the antenna drive portion and the motorized antenna portions are very complicated. Furthermore, the controller, which is built in the antenna portion is apt to be affected by rain drops, deteriorating the switch operation.

The conventional electronic-controlled antenna has a disadvantage of error-functioning because of the effects of outside noise and electronic parts in the automobile. Also, the parts constituting the electronic control mechanism are expensive, electronic circuits are complicated and of high quality, manufacturing of them is difficult. Except for ones of a manual switch types or electronic control types, the extension length of the antenna corresponds to the distance determined by the built-in switch exclusively. Accordingly, a convenient value of extension suitable to respective receiving condition or any necessity can not be obtained.

Because the control means is driven by the same motor as that used for extending and contracting the antenna, when the antenna mal-functions is overloaded, or frozen the control means stops, which causes a burn-out of the motor. When the charging performance of a battery drops because of a cold environment of the battery sufficient and complete function of the controller is not obtained. There is a difference in operation of the controller in the high-voltage/hot environment and the low-voltage/cold environment, so that shock applied to the antenna operating wire during extension and contraction be made simple and to which antenna a double-line cable of electricity can be connected to operate the antenna driving motor. The motorized antenna control mechanism described above can be attached to the car body without difficulty and is not affected of humid air, dust, or bad weather conditions. Furthermore, an operation of the control mechanism is not affected by a failure of the antenna proper, overloading, and drop of power source.

A motorized antenna to be installed. It has been difficult to attain the suitable and proper matching between the antenna operation and the motor driving for sufficient extension and contraction of the antenna.

When the antenna is in trouble or mal-functions, for example, it rises only half or descend only half owing to freezing respective section of antenna causing, over load condition the overload condition continues until the switch is turned off.

In the conventional motorized antenna, the antenna drive portion and a control portion for it is integrally constructed, so that the user of the antenna suffers limitation in size and space with reference to the car body structure and it is difficult to install it neatly.

Accordingly, the purpose of the present invention is to provide an automatic antenna extension and contraction mechanism for a transmitter/receiver, such as car radio, which mechanism operates in connection with the ON/OFF operation of the transmitter/receiver in car in order to make the antenna freely operable. The construction of the motorized antenna according to the present invention is simple, that is the power source for the driving motor has an ordinal dual-wire type power line and it can be manufactured in system mass-production system and can be installed in a separately from the motorized antenna to be controlled by the automatic antenna extension and contraction mechanism.

According to another object of the present application, is to provide the automatic antenna extension and contraction mechanism which is easy to install to the car structure and not affective by any environmental conditions, such as severe conditions of humidity and temperature.

Another object of the present invention is to provide the control mechanism for the motorized antenna operating without being effected of troubles of the antenna, abnormal loading, and power performance deterioration.

SUMMARY OF THE INVENTION

In accordance with the present invention, a control means is provided in a drive circuit for the motorized antenna motor arranged in parallel to the circuit of of the receiver/transmitter. The circuit of course is capable of receiving and transmitting. When a power ON-OFF switch for the receiver/transmitter. A manpulator is provided to give manually the control instructions to the control means attaining an extention and contraction of the motorized antenna. These functions in cooperation with the power ON-OFF operation for the transmitter/receiver, and thus the particular length of extended or contracted antenna is directly related with the instructions given through the control means.

According to the present invention, a control means is provided in a drive circuit for the motorized antenna motor installed in parallel with the transmitter/receiver circuit. A power source ON-OFF switch of the transmitter/receiver, as well as a hand cooperate to supply manipulation portion control instruction to the control means. A control means driving motor is provided separately from the motorized antenna motor as described above as a mechanical control means operating in pursuance of the control instructions given from the manipulation portion, so that the motorized antenna motor and the control means drive motor are operated in cooperation with the operation of the power source ON-OFF for the transmitter/receiver, obtaining the length of extension and contraction determined by the instruction given by the manipulation portion.

The control means mainly consists of a switch plate rotatably mounted by the drive motor for the control means built in a case. A rotable portion manipulatable by a manipulator situated outside of the case can be arranged on the switch plate as a movable contactor.

The switch plate has the first contact connected to the switch plate through a circuit extending from the power switch of the transmitter/receiver and relay circuit, the second movable contact connected to an end of the power source through a changeover switch in the relay switch, and a fixed contact connected to another end of the power source. Respective movable contacts are operable by manipulator situated outside of the case.

The control means operating drive motor circuit for driving the control means is placed parallel with the antenna motor driving portion in the motorized antenna motor driving circuit. A supplement circuit is provided in the control means driving motor circuit by arranging a diode in parallel with a resistor in order to carry out extension and contraction of the motorized antenna in cooperation with the ON/OFF operation for the transmitter/receiver and to obtain the particular length of extension and cotraction in accordance with the instruction given by the manupulator. The control means is driven by a flow of current through the diode when extending the antenna and through the resistance when contracting the antenna, so that the power necessary when contracting is small compared to the antenna.

An adjustable resistor is used for the resistance and it is adjusted and set in accordance with a selection of motor characteristics of the motorized antenna employed or change of voltage and temperature of the power source, and a clutch operative condition.

In accordance with the present invention, an electric control apparatus comprising the control means having a compulsory discharge circuit, a constant current circuit, an integration circuit, a charge-discharge changeover circuit, a constant current circuit, and a voltage comparison circit. In order to make a manipulator, a set-changeover detecting circuit is connected to a standard voltage changeover circuit. The signal obtained by a cooperation of an analog control circuit and respective function blocks is used as a control signal supplied to the antenna motor drive portion by manipulating the manipulator.

Notwithstanding whether, a mechanical control means or electrical control means is used, only a control means is connected to the power ON/OFF circuit in the transmitter/receiver, such as of a car radio and a power supply cord for the motorized antenna drive motor is connected to the output end of the control means, the antenna extends or contracts its particular length or distance in acordance with the instruction given by manipulation of the control means' manipulator.

BRIEF DESCRIPTION OF DRAWINGS

FIG. 9 shows the general relationship of still another embodiment according to the present invention, FIG. 10 is a circuit structure showing the control means for the system of FIG. 9, FIG. 11 is an explanation of another embodiment of the circuit structure of the control means, FIGS. 12 and 13 respectively show the embodiments employing DIP switch as a manipulator, and FIGS. 14–16 each shows the embodiments of mechanical control system's typical circuit structure connected securely to a car body.

DESCRIPTION OF PREFERRED EMBODIMENTS

This invention will be explained with reference to the accompanying drawings of FIGS. 1–16.

Figure 1:
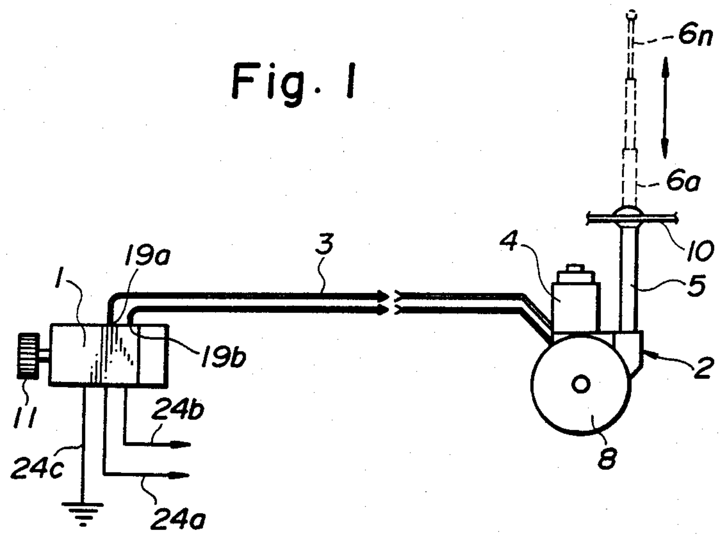
FIG. 1 shows the general construction showing how to apply the control to the motorized antenna.

FIG. 1 is a general view of the whole structural relationship of an embodiment of mechanical control system. As shown, the motorized antenna 2 attached to a car body plate 10 has a motor 4 and a controller 1 is connected to the antenna 2 by means of a power supply cord 3 and attached to a dashboard in the car interior. The motorized antenna has a plurality of antenna elements 6a–6n which are telescopically expandable and contractable in a cylindrical antenna basement 5. As well known, the plural antenna elements have been operated by rotation of a drum 7 through an operation wire. The drum 7 is driven by the antenna motor 4 and contained in a case 8.

Figure 2:
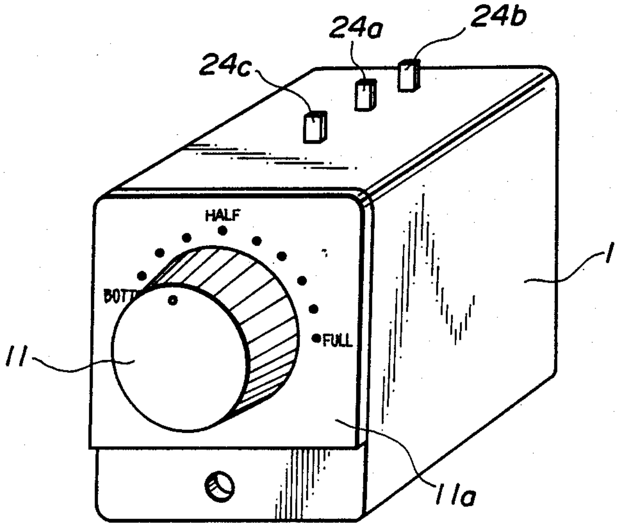
FIG. 2 is a perspective view of the front portion of the manipulator in the control mechanism according to the present invention.

As shown in FIG. 2, the controller 1 has a manipulator portion 11 at its front face. By selecting the suitable position within the range of "BOTTOM" and "FULL" of the manipulator portion 11 according to the indication graduation 11a, the suitable length of the antenna corresponding to the position can be obtained. On the indication graduation 11a, the length of the antenna can be graduated by using the classification of frequency to receive or to transmit excepting the system of "HALF" and "FULL".

Figure 3:
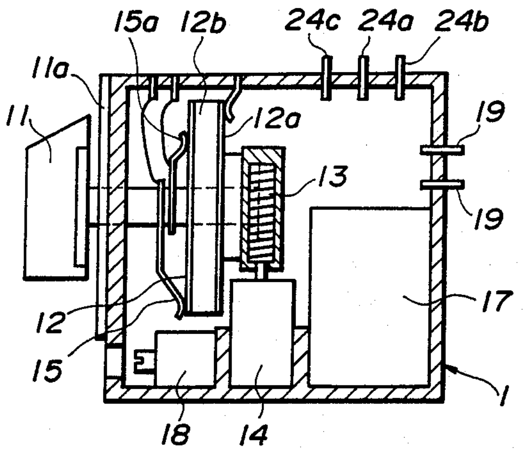
FIG. 3 is an elevational sectional view of one example of the control mechanism according to the present invention.
Figure 4:
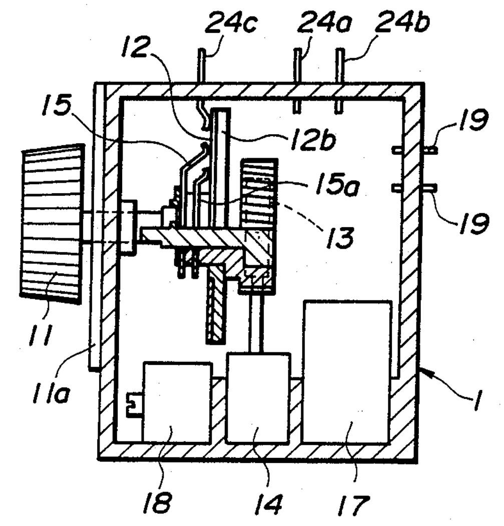
FIG. 4 is an elevational sectional view of another example.

The interior construction of the controller 1 is shown in FIG. 3 and it contains a small motor 14 for driving switch plates 12, 12a of control means. Although the power source for car electrical appliances has ordinarily DC12V, the small motor 14 is able to function by only the electricity of DC6V and less. The motor 14 rotates the switch plates 12 and 12a through a reduction 13 using, for example, warm gear arrangements. Respective switch plate 12 and 12a is placed opposite and on both the sides of the dielectric plate 12b. In the circuitry construction shown in FIGS. 5 and 6 of the switch plates 12 and 12a, a movable contact 15, and fixed contacts 16, 16a and 16b are connected to an end of the supply power source through a change-over switch 22 in a relay circuit and the first movable 15a are connected to the circuit led to the source switch through the relay circuit. The fixed contacts 16, 16a and 16b are connected to the end of the supply power source or the earth side, the fixed contacts 16 and 16a are adapted to contact with the switch plate 12a, and the mov-able contacts 15, 15a and the fixed contact 16b are adapted to contact to the switch plate 12. One of the movable contact 15 contacts with a peripheral position of the switch plate 12 and the other contact 15a contacts with the inside position of the switch plate 12. The contacting positions of the movable contacts 15, 15a are changed by means of the controller 11. The switch plates 12 and 12a have respectively non-conductive portion 12', 12" and 12a' formed in the radius rotary area in which these movable contacts 15, 15a and the fixed contact 16 contact. It is apparent that the switch plate 12, 12a may be placed at both sides of the dielectric plate 12b as shown in FIG. 3 or at either side of the plate as shown in FIG. 4 arbitrarily. As shown in FIG. 3 or 4, the controller 1 has a relay portion 17 containing a relay mechanism 17a for driving respective motors 4 and 14 in an ordinary direction and the opposite direction and the relay mechanism 17a is apparently operated by the receiver's power switch 21 such as a radio as shown FIGS. 5 and 6. Furthermore, a voltage controller 18 is fixed to the small motor 14 and the rotary speed of the motor 14 is controlled by the voltage controller 18 to adjust correspondingly the value of extension and contraction of the antenna elements 6a–6n.

Figure 5:
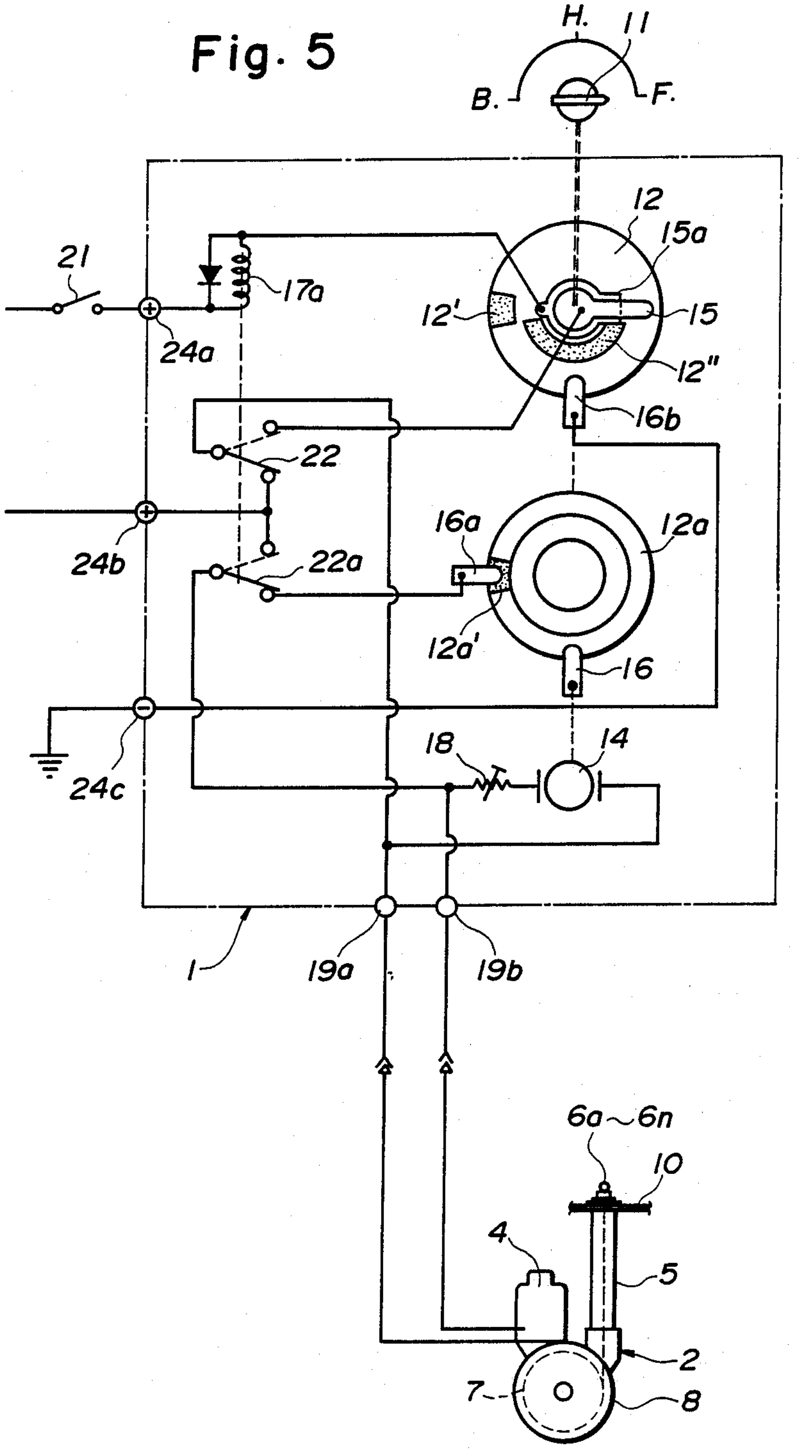
FIG. 5 is an shows of a construction of a circuit of the present invention.

FIG. 5 shows an example of a circuitry used in the controller 1 according to the present invention. The shafts of the movable contacts 15, 15a are dielectrized and the rotary motions of the switch plate 12, 12a are reduced in speed by the small motor 14. In the embodiment, a single relay mechanism 17a of the relay portion 17 is employed. When the power switch 21 of a radio is in OFF condition as shown, the relay mechanism 17a does not operate and the switches 22, 22a to be functioned by a relay operation are at their OFF condition to the power supply source. In this condition, the controller 11 is accord with the "FULL" position and the antenna elements have its most extendable status. The controller 1 has a terminal 24a connected to a lead line from the power switch 21 of the radio as an input terminal, a terminal 24b connected to the power supply source, and a terminal 24c connected to an earth. There are terminals 19a, 19b used as outout terminals connected to the power supply cord 3 of the large motor 4. The terminals 19a, 19b connected to the small motor 14 are in parallel in order to rotate and stop the motor 14 by the voltage control 18 connected to the large motor 4 in series similar to that of the small motor 14.

Figure 6:
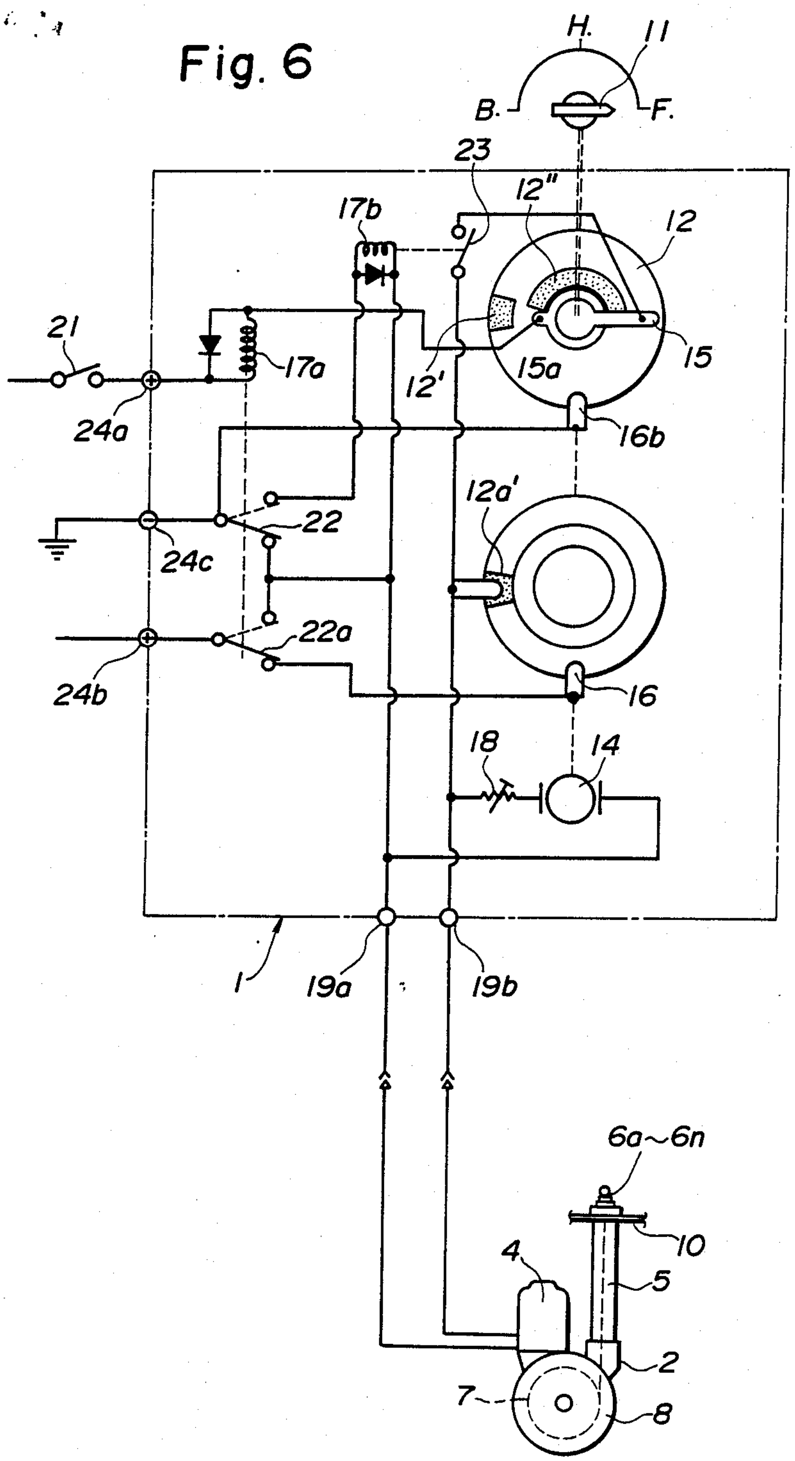
FIG. 6 shows another structure of the circuitry.
Figure 7:
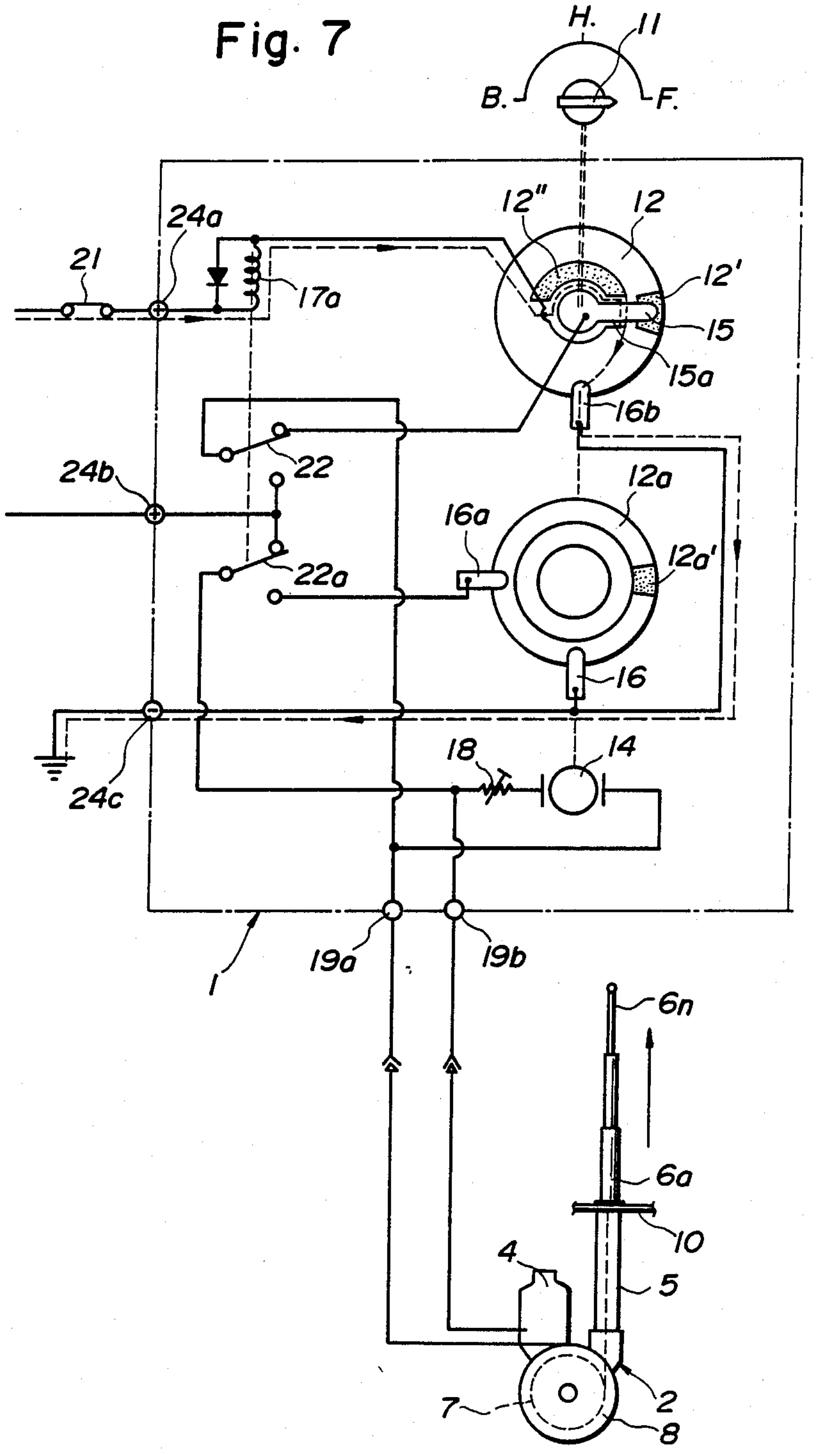
FIG. 7 shows the circuit construction explanation view of FIG. 5, but in which embodiment the antenna is fully extended.

FIG. 6 shows another relay portion 17 having both relay mechanisms 17a, 17b. The relay mechanism 17b has a function changing-over the switch 23 in a circuit connecting the motor 14 to the movable contact 15.

The detail of the embodiment mentioned above will be explained with reference to FIG. 5. In this embodiment, the power switch 21 of a radio is at OFF condition and the relay mechanism 17a does not operate. Accordingly, the switches 22, 22a to be operate by relaying are at OFF conditions to the switch plates 12, 12a preventing the motors 4 and 14 from rotating and keeping the antenna elements in contracted condition.

When the power switch 21 of the radio is turned ON, the relay mechanism 17a operates and the switches 22, 22a are changed-over, so that the current flows through the circuit between terminals of the power supply source, as a result the motor 4 on the paper rotates counterclockwise and the motor 14 revolves clockwise. Owing to the clockwise rotation of the motor 14, the switch plate 12, 12a rotate on the paper clockwise and when they rotate about 180° full extension of the antenna elements 6a–6n completes.

Due to the full extension of the antenna elements, the movable contact 15 contacts to the non-conductive portion 12' preventing the current from the power supply source from flowing, so that these motors 4, 14 stop in their rotation and these switch plates 12, 12a stop in their revolution.

When the power switch 21 of the radio is turned OFF, the relay mechanism 17a stops and the switches 22, 22a return to the position shown in FIG. 5 by the bold line (the movable contact 15 is at its non-conductive condition). As a result, the flowing direction of current from the supply power source to the motor 4, 14 is opposite in direction when the antenna is extending from that when the antenna extends. Thus, each motor 4, 14 rotates along the opposite direction, retracting the antenna elements 6a–6n and rotating the switch plate 12, 12a counterclockwise. The counterclockwise rotation of the switch plate 12a continues along about 180° of semi-circle until the non-conductive portion 12a' contacts to the fixed contact 16a, finishing the complete contraction of the antenna elements 6a–6n and obtaining the condition shown in FIG. 5.

The example described above, shows when the manipulator 11 is set at the full extension position. However, the manipulator 11 is set at any halfway position other than "FULL" position mentionedabove, the motor 4, 14 stop at the position before the movement reaches 180°. So that, the antenna elements 6a–6n stop halfway in their extension and start their contraction.

As shown by way of example in FIG. 2, when the manipulator 11 is set at "HALF" position, rotation of the motor 4, 14 rotates the switch plates 12, 12a along about 90° to have the movable contact 15 contact the non-conductive portion 12'. As a result, the motors 4, 14 halt their rotation, stopping the extension of the antenna elements 6a–6n and rotation of the switch plates 12, 12a, being stopped the antenna is at its middle position. When the power switch 21 of the radio is turned OFF after that, the antenna elements 6a–6n which have been extended to the halfway position back to the complete contraction condition as shown in FIG. 5 due to the reverse rotation of the switch plates 12, 12a from their halfway position.

Figure 8:
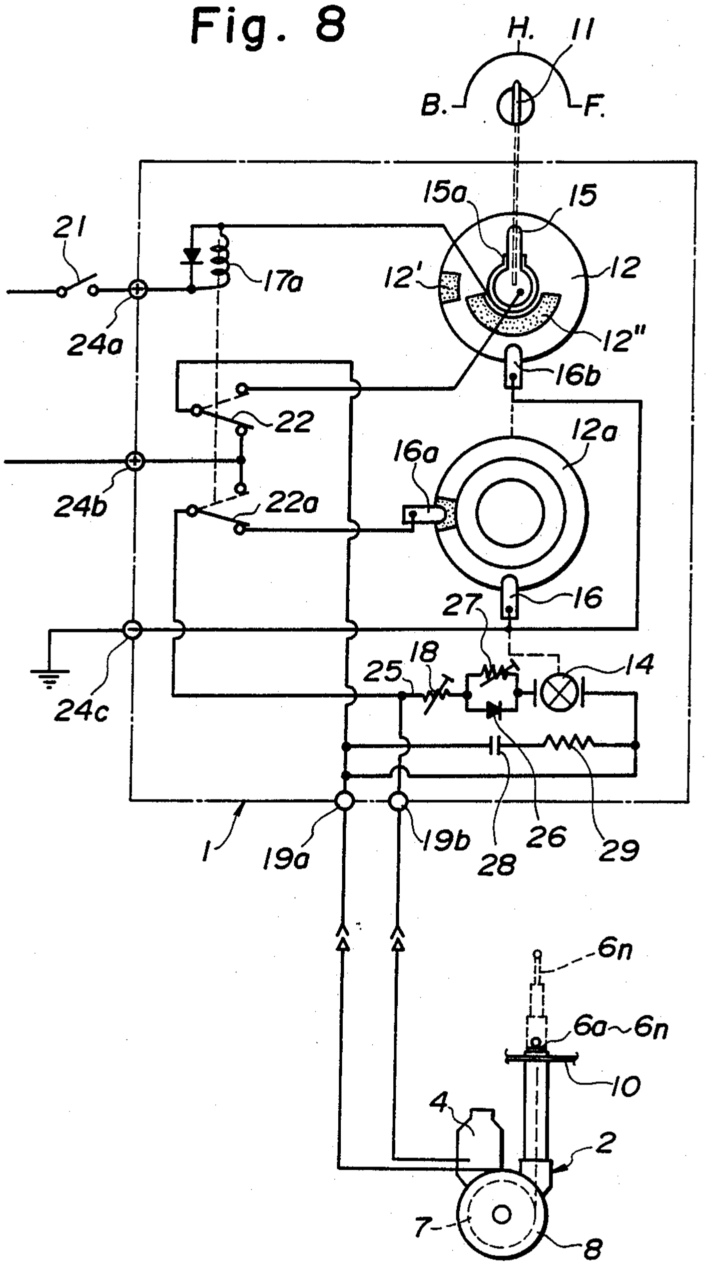
FIG. 8 is the circuitry constructure explanation view when the antenna elements contract from their full extension condition to half extension condition and the circuitry has a separate supplement circuit at the small motor.

FIG. 8 depicts the case in which the power switch 21 of the radio is kept in an OFF condition and the extension position of the antenna elements changes from a full to a halfway position. The manipulator 11 which have been set at the full extension position is set at a halfway extension status, thus the mavable contact 15a contacts with the non-conductive portion 12" formed inside diametrically of the switch plate 12 connected to the power source through the relay mechanism 17a, cutting the current flow through the switch plate 12. Accordingly, the relay mechanism 17a is made non-operative and the switches 22, 22a change-over from the contacted condition at the upward condition to the downward condition, forming a reverse circuit led to the power source opposite to that of the antenna reversing the motors 4, 14 to retract the antenna elements 6a–6n. When the switch plate 12 returns to its half-way position set, the non-conductive portion 12' contacts the movable contact 15, the motors 4, 14 halt at the present position, and the antenna elements 6a–6n stop at the halfway position set to receive radio wave.

When the antenna elements have their halfway extension condition as described above, the movable contact 15a positioned inside diametrically of the switch plate 12 has current-flowing condition therethrough repeatedly. As a result, current flows through the relay mechanism 17a and the switchwes 22, 22a are changed from the depicted lower contacted position to the upper contacted position. The power source circuit of the switch plate 12 is at non-current condition, stopping motors 4, 14 and halting the switch plates 12, 12a.

The halfway position does not mean only the "HALF" position shown in FIG. 2 but means any positions between ends. That is any halfway position of the antenna can be selected and the antenna elements extends to the particular or arbitrary position and contacts from that position.

The operation mentioned above can be obtained in the circuit shown in FIG. 6.

That is, as shown in FIG. 6, under the condition of that the antenna has been contracted and stopped, the manipulator 11 rotates to its full extension position, and the movable contacts 15, 15a are brought to the shown positions, when the receiver's power switch 21 is turned ON, the relay mechanism 17a operates, changing-over the power switches 22, 22a. Consequently, a circuit from the power terminal 24b to an earth terminal 24c through the relay mechanism 17b is formed, placing the relay switch 23 ON and forming another circuit from the power source to the earth terminal 24c through each of motors 4, 14, the movable contact 15, the relay switch 23, and the switch plate 12. Due to the operation described above, the antenna starts in its extension and switch plates 12, 12a begins on their rotation (on the paper clockwise).

After respective switch plates 12, 12a rotate for about 180° angular degree to fully extend the antenna, the non-conductive portion 12' contacts with the movable contact 15 preventing current from flowing to the motors 4, 14 through the movable contact 15 and keeping the antenna sections 6a–6n at their full extension condition. At the time, current flowing is continued to the relay 17a through the movable contact 15a and the switches 22, 22a are kept at their positions changed changed, as shown by imaginaly lines in FIG. 6 to keep current flowing through the power source relay 17b. Turning the receiver's power switch 21 OFF cuts current flow through the relay 17b. When the power switches 22, 22a are changed to their positions as shown by bold lines in FIG. 6, current flow to the relay 17b is change OFF making the switch 23 OFF condition and cutting current flow through the switch plate 12. The current in opposite direction to that when the antenna extends, flows to both motors 4, 14 through the contacts 16, 16a on the switch plate 12a to rotate the motors along the opposite direction and to rotate the switch plates 12, 12a counterclockwise, attaining contraction of the antenna. After a completion of antenna contraction and a counter-rotation of the switch plates 12, 12a for about an angle 180° on the drawing, the switch plates 12, 12a return to the condition shown in FIG. 6.

Setting the manipulator 11 from the position above to the half-extension position, the movable contacts 15, 15a are made at their vertical position in FIG. 6. When the receiver power switch 21 is turned ON with the manipulator 11 being set its half-extension position, current flows to the relays 17a, 17b and the motors 4, 14 to extend the antenna and to rotate the switch plates 12, 12a. However, because the movable contacts 15, 15a are kept at the half position, when the non-conductive poriton 12' of the switch plate 12 reaches the position of the movable contact 15, current being earthed from the motors 4, 14 through the movable contact 15 is stopped to halt the motors 4, 14 and the antenna at its half extension position. In order to fully extend the antenna or fully contract it from its half extended condition, the manipulator 11 is rotated to set the movable contacts 15, 15a at any positions. The operation obtained after the setting above is apparently the same as the operation of the last step in the full extension step or the contracting step from its full extended condition. The operation of the antenna from its full extension condition to its half extension one will be described. When the receiver power source switch 21 is in the ON condition, the movable contacts 15, 15a are set at their intermediate position by operation of the manipulator 11, movable contact 15a extends fully to contact with the non-conductive portion 12" situated in its lower half position. As a result, the relay 17a is made inoperative and the switches 22, 22a are placed at the positions shown by bold lines in FIG. 6, making the switch 23 OFF. Current flows to each motors 4, 14 from the power switch 22a through the contacts 16, 16a on the switch 12a to rotate the switches 12, 12a counterclockwise for about 90°, contracting the antenna to its middle position. Thus, the non-conductive portion 12" of the stopped switches 12, 12a is retreated from its cutting-off condition of the movable contact 15a. The relays 17a, 17b are in their operative condition, taking power switches 22, 22a their dotted line positions. Because the movable contact 15 is located situates on the non-conductive portion 12′, the antenna is held at its half contracted position.

The rotary angle of the manipulator 11 from "BOTTIOM" to "FULL" and the rotating range of switch plates may be selected at will so as to correspond with the employed motorized antenna by selecting the speed reduction ratio and adjusting the voltage controller 18.

As depicted in FIG. 8, with reference to the small motor 14 operating the control means, a correction circuit consisting of a variable resistors 18, 25 and a diode 26, respectively arranged in parallel is used. In order to protect the contacts, a circuit having a capacitor 28 and a resistor 29 arranged in series is placed in to the circuit for driving the small motor.

By appropriately adjusting and setting the variable resistor 25, it is freely applied to the change of motor characteristics of the used motorized antenna and power source voltage and pulsation. Some difference in operative time of the motor 14 between the times of antenna extension and contraction may be used to effectively solve a problem of incomplete contraction of the antenna. Also, it is possible to suitably select an operation of the clutching mechanism.

By forming the correction circuit on the small motor 14, which circuit having a variable resistor 25 and a diode 26 placed in parallel, when the antenna sections *6a–6n* extend, current flows through the diode 26 to drive the motor 14. When the power switch 21 is turned OFF and the antenna sections *6a–6n* contract, current flows through the variable resistor 25 to drive the motor 14. It is apparent that the rotary speed of the motor 14 in the former case in faster than that in the latter case. Comparing to that the operative speed of the motor 4 with in comparison to the antenna sections *6a–6n* is the same, the driving speed of the controllable switch plate during extending is always higher than that during contracting. Accordingly, a contraction of the antenna owing to the motor 4 lasts for the longer time, so that the antenna sections may be in the complete extracted stored condition without fail.

Because that resistant value of the variable resister 25 may be changed, the retarded or elongated time gap between when the antenna extends and when it contracts can be controlled at will, so that it can be applied to any changes of the characteristics and the like of the motor.

Figure 14:
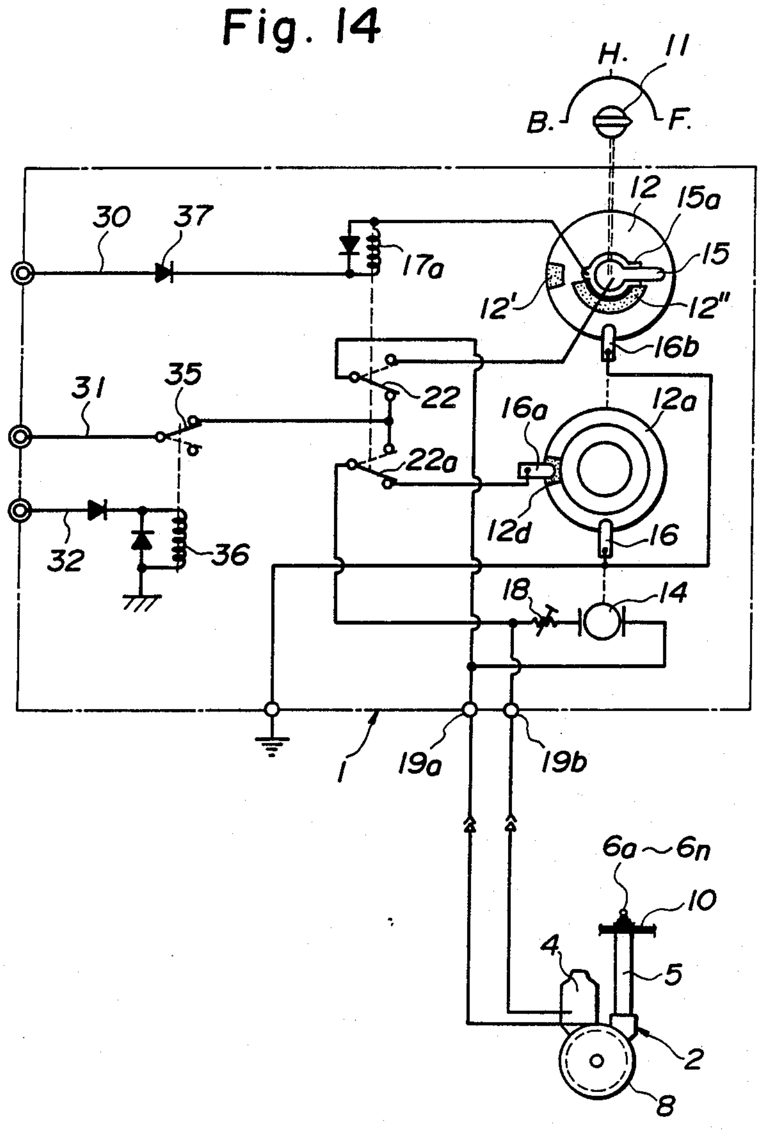
Figure 15:
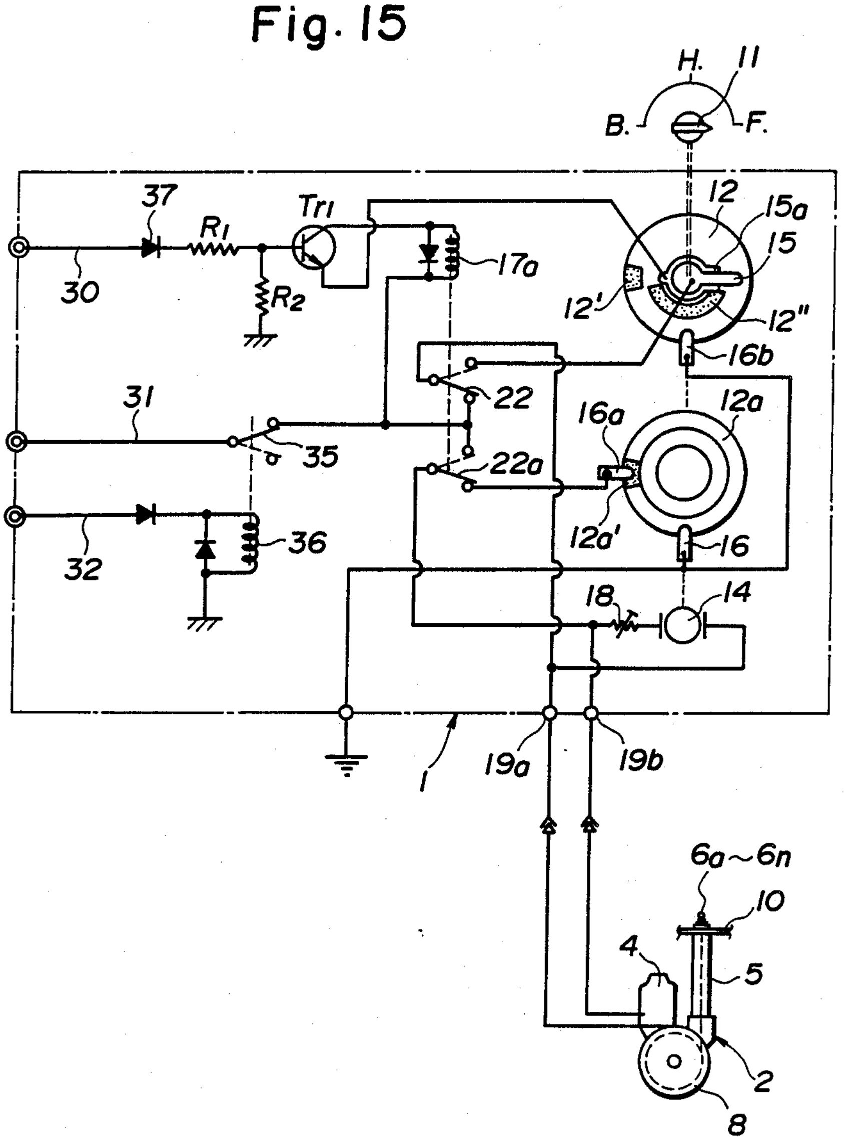
Figure 16:
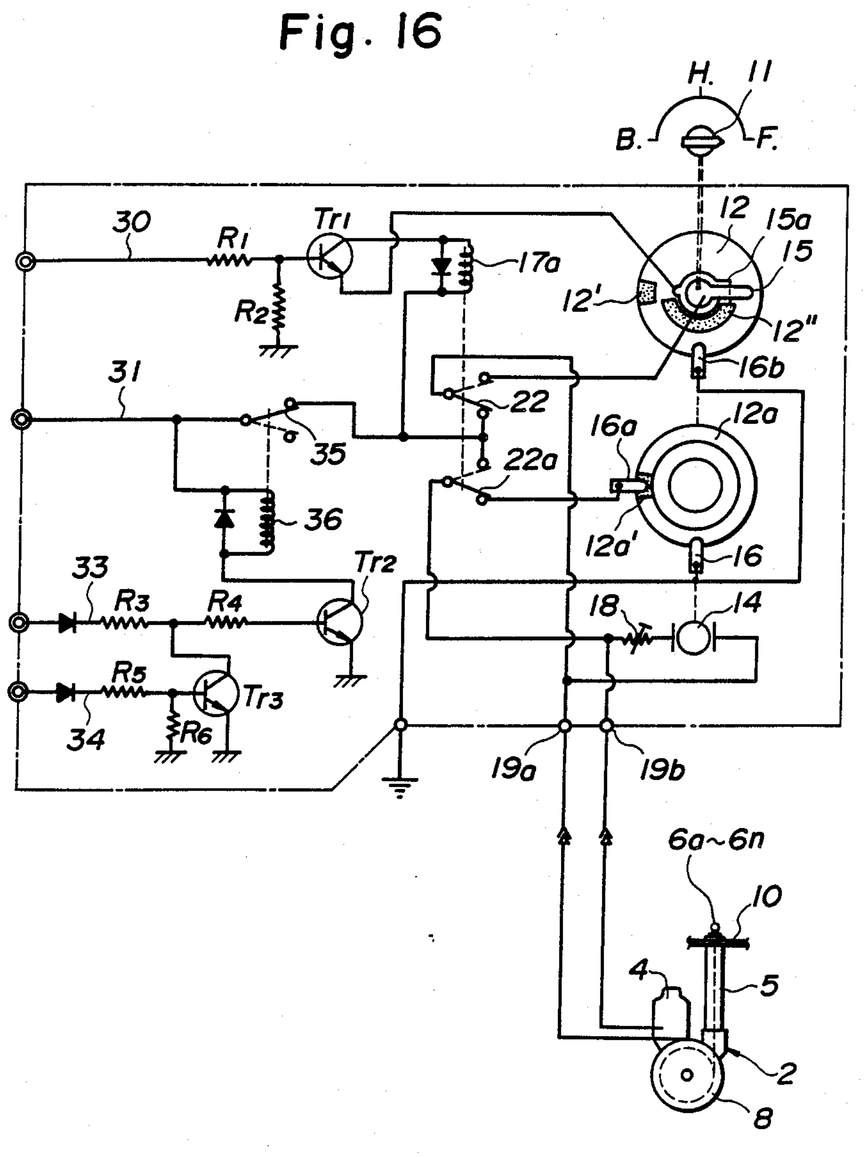

The various embodiments of the present invention are shown in FIGS. 14–16 and they are the motorized antenna equipped in ordinary manner. In the embodiment depicted in FIG. 14, a circuit 30 connected to a transmitter/receiver apparatus such as a radio has a diode 37 to protect the radio, and a switch 35 is given in a power circuit 31, which switch 35 is adapted to be operated by relay 36 installed in a starter circuit 32. Making the starter circuit 32 ON, the power circuit is cut to prohibit the antenna drive system from erroneous functioning.

Another embodiment shown in FIG. 15 is a switching transistor circuit having, in addition to the structure of the embodiment in FIG. 14, a set of resistors $R_1$ and $R_2$ fixed to the circuit 30 from the transmitter/receiver apparatus, which resistors $R_1$ and $R_2$ are given to a transistor $Tr_1$. Even the control signal from the circuit 30 is weak, installation of the switching transistor circuit make it possible to obtain an effective function of the relay *17a*.

Further, in the embodiment of FIG. 16, in place of the starter circuit 32 shown in FIG. 15, an ignition circuit 33 and an accessary circuit 34 are used and transistors $Tr_2$, $Tr_3$ and resistor $R_3$–$R_6$ are inserted in the circuits 33, 34 mentioned above to form a judgement or decision circuit. The decision circuit selects the signal on both the circuits 33, 34 in order to operate the power source circuit 31 through the relay 36 as like in the embodiment of FIG. 15.

The embodiment shown in FIGS. 14–16 is similar to that of FIG. 5. In case the relay *17b* is used as in the embodiment of FIG. 6 or in case of the embodiment shown in FIGS. 9–13, the circuitry structure shown in FIG. 14–16 is employed.

Figure 9:
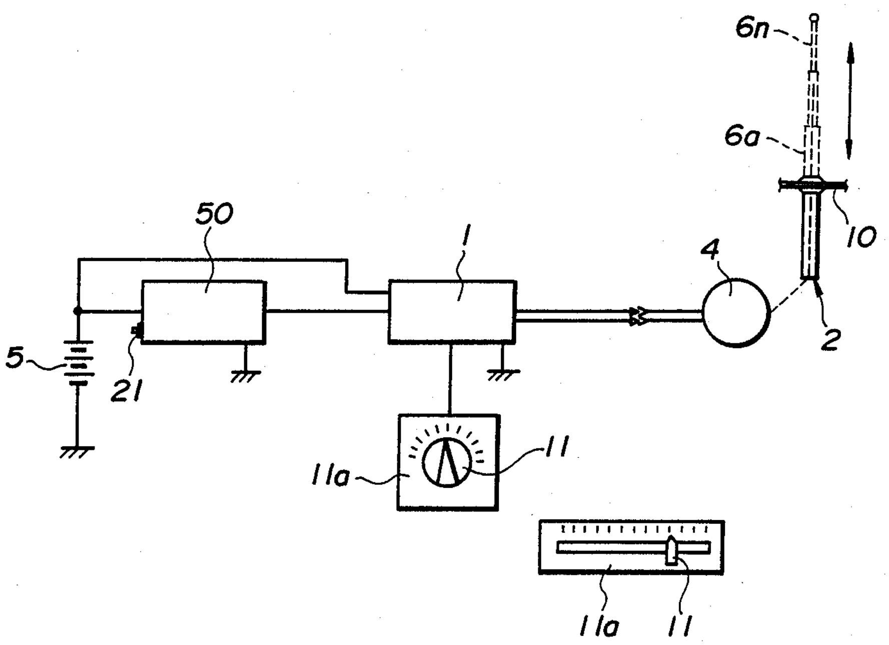
FIGS. 9–13 are the case of the electrical control system.

Another embodiment as shown in FIGS. 9–13 will be explained with reference to the figures. FIG. 9 depicts an outline of a motorized antenna, in which the transmitter/receiver apparatus 50, such as a radio connected to a power source 5 has a switch 21 and this switch connects to a transmitting receiving circuit in the apparatus 50 and to a control means 1. An output terminal of the control means 1 is connected with the motor 4 of the motorized antenna 3 to obtain a motor driving circuit. A manipulator 11 is installed to the control means 1 above and control instructions are obtained through the manipulator 11. As a manipulator 11, one of slide type may be used in the embodiment of FIG. 9, except for the rotary type shown in FIG. 9.

Figure 10:
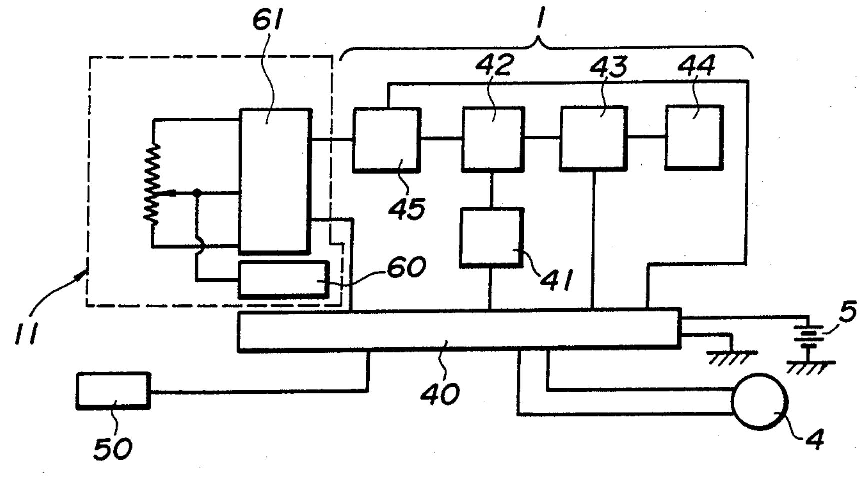

An embodiment of the circuit structure of the control means 1 is shown in FIG. 10, to the control circuit 40, a complusory discharge circuit 41, an integr-ation circuit 42, a charge-discharge changing circuit 43, a constant current circuit 44, and a voltage comparison circuit 45 are connected as shown. As shown by the manipulator 11 in FIG. 10, a setting change detecting circuit 60 and a standard voltage change-over circuit 61 connected thereto is employed, using the signal obtained by cooperation of the analogized control circuit and respective functional blocks as a control signal to be sent to the motor 4 through a manipulator 11.

The compulsory discharge circuit 41 compulsorily discharges the current charged in the integration circuit 42 in accordance with instructions of the control circuit 40 to make output voltage ($V_f$) of the integration circuit 42 zero (0). The integration circuit 42 integrates charging and discharging current from the charge-discharge change circuit 43 to impress charge voltage ($V_f$) to the voltage compulsory circuit 45. The charge-discharge change circuit 43 changes-over charging and discharging of the integration circuit 42 in accordance with the instructions of the control circuit 40. The constant current circuit 44 supplies a constant current to the integration circuit 42 through the change circuit 43 to make a charge-discharge voltage characteristic for time of the integration circuit 42 constant (linear). The voltage comparison circuit 45 compares charge voltage ($V_f$) with the standard voltage ($V_y$) to output a logic "1" when $V_f > V_y$ and a logic "0" $V_f \leqq V_y$ to a control circuit 40.

The standard voltage change-over circuit 61 impresses either one of an output voltage $V_x$ from the antenna position setter namely the manipulator 11 or a signal output $V_z = 0(V)$ from the control circuit 40 to the voltage comparator 45 as the standard voltage $V_y$. The changed setting detecting circuit 60 detects the increment or decrement (± differential) of the output voltage $V_x$ from the manipulator 11 for setting the antenna position to output it to the control circuit 40. The manipulator 11 output a voltage $V_x$ which corresponds to the antenna position desired by a user. The voltage $V_x$ is obtained as shown by changing the contacting position of a movable contactor relative to a resistor. The control circuit 40 controls respective functional blocks above according to the ON-OFF condition of the radio switch and setting of downing signal (DWS) and to automatically contact and extend the antenna.

The operation of the control circuit 40 will be explained. The power source being ON, the control circuit 40 discharges electricity on the integration circuit 42 through the compulsory discharge circuit 41 to impress $V_f=0(V)$ on the voltage comparing circuit 45 and impress $V_y-V_x$ on the circuit 45 through the standard voltage change circuit 61. Also, the control circuit 40 makes the signals (UPS) and (DWS) OFF of the initial condition. When the radio switch is turned ON and manipulator 11 is set at the zero position $[V_y=V_x=0(V)]$, control circuit 40 changes over the charge-discharge change-over circuit 43 to its charge side, however $V_f=V_y=0(V)$, so that the output of voltage comparator circuit 41 is 0, and the signals in the control circuit 40 become OFF statuses of the inicial condition keeping the antenna at its stationaly status. On the contrary, when the manipulator 11 is set at its initial position $[V_y=V_x=Y_1(V)]$, the control circuit 40, being received ON of the radio switch, changes over the change-over circuit 43 to the changing side. Because $V_f<V_y[Y_1(V)]$, the output of the voltage comparator circuit 45 becomes 0, making the signal (UPS) of the control circuit 40 ON. As a result, the antenna starts its raising motion. The integration circuit 42 begins its charging of the constant current from the constant current circuit 44 to increase $V_f$. When an equation of $V_f>V_y$ is obtained, the output of the voltage comparator circuit 45 becomes "1", the control circuit 40 halts a raising signal (UPS) to stop the antenna at this time. The distance of the antenna moved for the passage of the time corresponds to the desired position of the antenna extension and contraction.

When the setting position of the manipulator 11 is changed to the upward side $[V_y=V_x=Y_2(V), Y_2>Y_1]$, the changed setting detecting circuit 60 detects the changed setting position to output an increment directional change signal. The control circuit 40 receives this change signal to change the charge-dischange change-over circuit 43 to a charge side. At the time, the control circuit 40 receives the change signal and an output O $(V_f<V_x)$ of the voltage comparator circuit making the raising signal (UPS) ON. Similarly to this operation, after the passage corresponding to $Y_2-Y_1(V)$ elapses an equation of $V_f>V_y$ is obtained, becoming an output of the voltage comparator circuit 45 "1" and the raising signal of the control circuit 40 OFF.

When the setting position of said manipulator 11 is changed $[V_y=V_x=Y_3(V), Y_3<Y_2]$, the changed setting detecting circuit 40 detects the change to output a downward direction changing signal, which received by the control circuit 40 to change over the charge-discharge change-over circuit 43 to a discharge side. Then, the control circuit 40 receives an output "1" $(V_f>V_y)$ of the voltage compalator circuit 45, making down signal ON and starting the antenna in its downward movement. The integration circuit 42 begins discharging the constant current from the constant current circuit 44, decreasing $V_f$. When $V_f$ becomes $V_y$, the output of the voltage comparator circuit 45 is made zero, the control circuit 40 makes down signal (DWS) OFF halting the antenna instantly. It is apparent that this halt position of the antenna is determined by the distance of movement corresponding to the time passage integrated from 0 to $Y_3(V)$.

When the radio switch is turned OFF, the control circuit 40 changes over the charge-discharge change-over circuit 43 to its discharge side and makes a standard voltage $V_y$ of the voltage comparator circuit 45 $V_z=0(V)$ by means of the standard voltage change-over circuit 41. Consequently, the output of the circuit 45 becomes "1" $(V_f>V_y)$ the control circuit 40 makes a down signal (DWS) ON, descending the antenna. Electricity of the integration circuit 42 begins to discharge at a constant current from the constant current circuit 44, decreasing $V_f$. When an equation of $V_f=V_y=0(V)$ is attained, the control circuit 40 makes a downsignal OFF. As a result, the antenna halts at its initial position and the control system of the present invention obtains its initaial status.

On the other hand, although the case in which the antenna length is differed according to the kind of antenna as shown in FIG. 10 employs a particular setting circuit and FIG. 10 omitts the setting circuit, a full-scale setting circuit may be added to the manipulator 11 to change the full-scale of $V_x$ according to the antenna length. Conventional devices, such as compensating circuit for changes of power source voltage, temperature and humidity, and offset are omitted.

Figure 11:
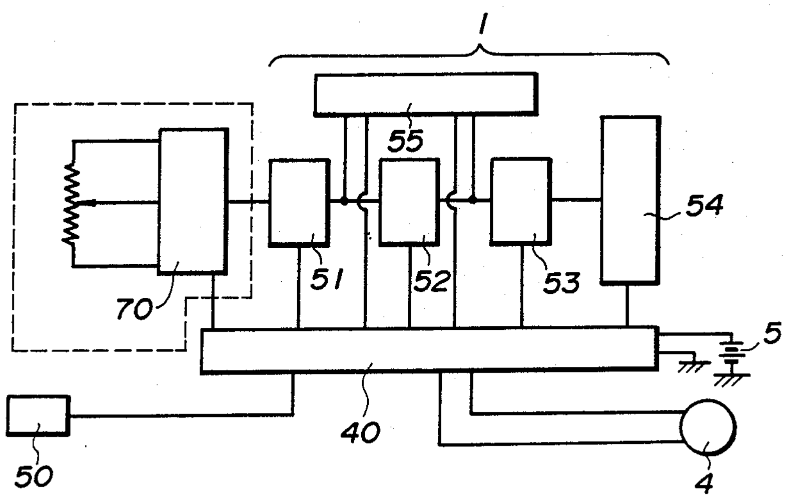

Another embodiment of specific circuitry of the controller 1 is shown in FIG. 11. As usual, a voltage $V_x$ corresponding to the extended length of the antenna is output by using the manipulator 11 for setting the antenna position. The manipulator 11 has an A-D converter 70 which is connected to a control circuit 40 and an A-D data latch circuit 51. Also, the control circuit 40 is connected to an A-D data memory circuit 52, a comparator 53, and a memory circuit 54 for antenna's present position, and these parts are connected to each other as shown. A discrete set-change detecting circuit 55 is connected to the control circuit 40 and between both the parts 51 and 52, 52 and 53.

According to the instructions (ADS) from the control circuit 40, the A-D converter 70 starts its converting operation. When the operation completes, the A-D converter 70 outputs a convertion completion signal (EOS) into the control circuit 40 and outputs digital data to the A-D data latch circuit 51 as well. The A-D data latch circuit (DLT) 51 latches digital data from the A-D converter 70 according to the instructions (DLE) of the control circuit 40. The set-change detecting circuit 55 calculates data of the A-D data latch circuit 51 and the A-D data memory circuit (ADM)52 according to the instructions (CMS) of the control circuit 40 by using the following equations (I, II):

$$ADM \geqq DLT-OFS \qquad I$$

$$ADM \leqq DLT+OFS \qquad II$$

Only when both the equations are satisfied, a signal (SCS) makes its signal a logic "0", and others make a logic "1", then outputs the delection completion signal (DES) into the control circuit 40.

In order to prevent the motorized antenna from vibrating due to any A-D conversion error, the set-change detecting circuit 55 moves the antenna only when the A-D conversion data larger than a certain off-set value (OFS). If an antenna position setter (APS) corresponding to the manipulator 11 is a digital type one (for example, a dip switch), the set-change detecting circuit 55 is not necessary. In this case, it is apparent that the A-D data latch circuit 51 additionally is not necessary.

The A-D latch memory circuit (ADM) 52 stores the data of A-D data latch circuit 51 in accordance with the instructions (DME) of the control circuit 40. The comparator 53 always compares data of the A-D data memory circuit (ADM) 52 with data of the antenna's present position memorizing circuit (RPR) 54 to output three kinds of information of ADM>RPR, ADM=PRP, ADM<RPR respectively to the control circuit 40. The circuit (RPR) 54 memorizes data of the antenna's present position according to the instructions of a clock (CLK) and an addition-subtraction signal (UDC). The control circuit 40 has been explained with reference to FIG. 10, to which an oscillat- or (OSC) for generating the standard clocking pulses is attached.

The embodiment shown in FIG. 11 will be described. Closing the power source, the control circuit 40 re-sets the latch circuit 51, the setting-change detecting circuit 55, data memory circuit 52 the antenna's present-position memory circuit 54 and makes the rising signal (UPS) and the descending signal (DWS) OFF-condition, restoring them to their initial condition. When the radio switch is turned on and the set of the manipilator 11 is at 0-position [$V_x=0(V)$], the control circuit 40 instructs a start of A-D conversion to the A-D convertor 70. The convertor 70 outputs an A-D conversion complete signal (EOS) to the control circuit 40 and a data (all zero). Then the control circuit 40 outputs an instruction (DEL) to make the data of the A-D convertor 70 latched in the A-D data latch circuit 51 and to operate the setting change detecting circuit 55 according to the signal (CMS). The detecting circuit 55 substitutes the data (DLT) of the A-D data latch circuit 51 and other data (ADM) of the A-D data memory circuit 52 in the equations I and II previously mentioned and calcuates the equations. The data (DLT) and (ADM) are respectively zero. Completing the calculation, the detecting circuit outputs a signal (SCS) "0" (the output of the A-D data latch circuit=the output of the data memory circuit 52=all zero, satisfying the equations I and II) and a detection completion signal (DES) to the control circuit. The control circuit 40 judges that there is no change in setting, keeping the raising signal (UPS) and the descending signal (DWS) at their initial namely OFF position and holding the antenna portions at the halt position. When the manipilator 11 is set at the desired position [$V_x=Y_1$ (V), the digital value $DY_1$ for $Y_1$ is larger than an off-set value (OFS)] and the radio switch is ON, the control circuit 40 instructs a start of A-D conversion to the A-D convertor 70. The convertor 70 outputs an A-D conversion completion signal (EOS) to the control circuit 40 as well as a digital data ($DY_1$) corresponding to $V_x$. According to the A-D conversion completion signal (EOS) from the control circuit 40 output the instruction (DLE) to make the data of the A-D convertor 70 is latched to the A-D data latch circuit 51. According to the signal (CMS) from the control circuit 40, the set-change detecting circuit 55 operates. The set-change detecting circuit 55 substitutes the datas (DLT), (ADM) of the A-D data latch circuit 51 and the A-D data memory circuit 52 for DLT and ADM in the equations I and II and calculates them. Completing the calculation, the setting-change detecting circuit 55 outputs the signal SCS "1" [the output (all zero) of the A-D data memory circuit 52<$DY_1$+off-set value (OFS)] and the detection completion signal (DES), respectively to the control circuit 40. Owing to the signal SCS "1", the control circuit 40 instructs an instruction DME to memorize the data of the A-D data latch circuit 51 in the A-D data memory circuit 52. All processes mentioned above are excuted periodically, on ON of the radio switch, due to the instruction of the control circuit 40. However, the instruction DME of the control circuit 40 memorizes the data of the A-D data latch circuit 51 to the A-D data memory circuit 52 only when the signal SCS "1" is issued. Here, the output of the comparator 53 has the condition of the A-D data memory circuit: ADM 52 ($DY_1$)>the antenna's present position memory circuit: RPR 54 (all zero) so that the control circuit 40 judges that the set-change directs to increasing direction to make the raising signal (UPS) ON, raising or extending the antenna. Simultaneously, the addition-subtraction signal (UDC) is made "1" (the antenna's present position memory circuit 54 carries out its addition) to raise the antenna and to count the clock pulses of the antenna's present position memory circuit 54 by means of a clock. After the time of $DY_1$ is clocked, the output of the comparator 53 shows that the data (ADM) of the A-D data memory circuit 52 equals the data (RPR) of the antenna's present position memory circuit 54. Then, the control circuit 40 makes the raising signal (UPS) OFF to stop the antenna. The length of the antenna corresponds to the length of clocked time. When the set position of the manipulator 11 is changed toward the raising end [$V_x=Y_2(V)$, $Y_2$->$Y_1$, $DY_2-DY_1$> off-set balue (OFS)], the control circuit 40 excutes the same judge and operation as described above because the signal SCS equals a logic "1". Thus, the control circuit 40 continues to output the raising signal (UPS) for the clocked time of $DY_2-DY_1$ to raise the antenna. In case that the manipulator 11 is changed of its set position toward the down end [$V_x=Y_3(V)$, $Y_3<Y_2$, $DY_2-DY_3$> off-set value (OFS)], the control circuit 40 periodically outputs the downing signal from the instance of issuance of the instruction ADS to that of receipt of the detection completion signal (DES) during ON of the radio switch. In this case, the signal SCS is made a logic 1 [the A-D data memory circuit 52's data (ADM) ($DY_2$)>$DY_3$- off-set value (OFS)], the control circuit 40 issues instruction (DME) to memorize the data of the A-D data latch circuit 51 in the A-D data memory circuit 52. Then the output of the comparator 53 shows that the data (ADM) ($DY_3$) of the A-D data memory circuit 52 is smaller than the data (RPR) ($DY_2$) of the antenna's present position memory circuit 54, so that the control circuit 40 concludes that the set has been changed toward a reduction end, issuing a down signal (DWS) to descend the antenna portion and making the addition-substraction signal (USC) a logic "0", [the antenna's present position memory circuit 54 operates its subtraction operation], so that the clock (CLK) clocks the antenna's present position memory circuit 54. After the time duration corresponding to $DY_2-DY_3$ has elapsed, the output of the comparator 53 indicates that the data (ADM) of the A-D data memory circuit 52 equals the data (RPR) of the antenna's present position memory circuit 54, control circuit 40 starts the down signal (DWS) OFF to stop the antenna at the position. It is apparent that the travel ed distance of the antenna corresponds to the time elapsed from the zero position to $Y_3(V)$ ($DY_3$). If any error is generated in the A-D conversion operation and the control circuit 40 outputs $DY_4$[$DY_3$-- $DY_4$<off-set value (OFS)] in spite of the correct setting of the manipulator 11, the following equations are satisfied.

[The data (*ADM*) of the *A-D* data memory circuit 52 ($DY_3$)] $\geqq$ [the data (*DLT*) of the *A-D* data latch circuit 51 ($DY_4$)] $-$ [off-set value (*OFS*)],

[The output (*ADM*) of the *A-D* data memory circuit 52] $\leqq$ [the output (*DLT*) of the *A-D* data latch circuit 51] $+$ [off-set value (*OFS*)].

As a result, the signal SCS is made "0", the control circuit 40 does not transmit the data of the A-D data latch circuit 51 to the A-D data memory circuit 52, keeping the control of the circuit 40 by means of the A-D conversion data previously stored in the memory circuit 52. Consequently, the antenna cannot move if the A-D conversion error is occured.

Opening the radio switch, the control circuit 40 resets the A-D data memory circuit 52. The output of the comparator 53 indicates that the data output (all zero) of the A-D data memory circuit 52 is smaller than that of the antenna's present position memory circuit 54 ($DY_n$), so that the control circuit 40 outputs a down signal (DWS) to make descend the antenna. At the same time, the control circuit 40 makes the addition-substraction signal (UDC) a logic "0" (the antenna's present position memory circuit 54 operates its subtraction operation), to clock the memory circuit 54 by means of a clock. After the time elapse corresponding to $DY_n$, the output of the comparator 53 shows that the data (ADM; all zero) output from the A-D data memory circuit 52 is equal to the data (RPR; all zero) output from the antenna's present position memory circuit 54, and the control circuit 40 makes the descending signal OFF, stopping the antenna. At this time, the antenna is stopped at its initial position and the control system for the motorized antenna moves to its initial condition.

Although the antenna position setting circuit used in case of different antenna structure having a different antenna length is omitted in FIG. 11, it is easy to understand that a full-scale setting circuit may be attached to the antenna position setting device, such as the manipulator 11, so as to change the full-scale, according to the antenna length. In case that the antenna position setting device or the manipulator 11 operates in a digital manner, a full-scale change circuit may be installed between the digital setter and the A-D data latch circuit 51.

The controlling system for the motorized antenna according to the present invention can be excuted with a microprocessor. Since various MPU and MCU having different functions are on the market, the carry out the present invention suitable electric parts can be selected. Also, any input/output device can be selected in order to determine the particular device suitable to the situation. With reference to the softwere, a program f or excuting the controller system can be fabricated in order to effectively operate the controller system.

Figure 12:
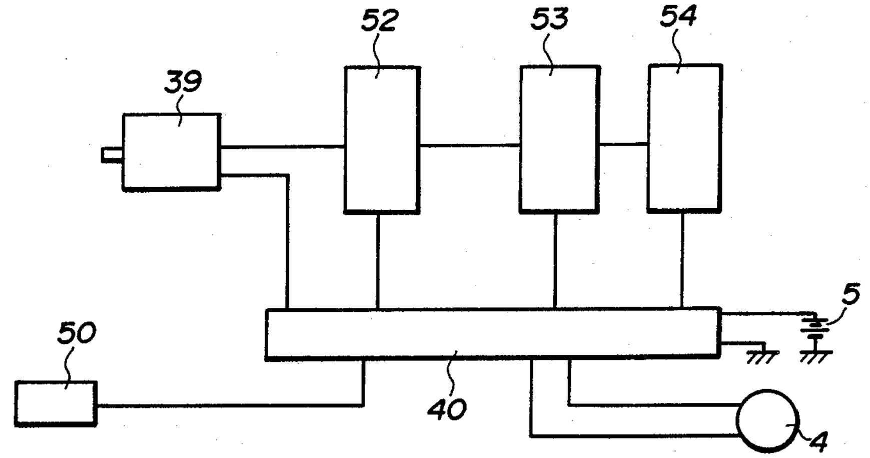
Figure 13:
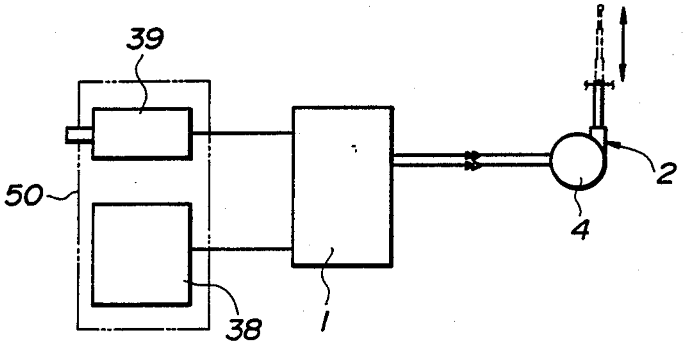

In the controlling system shown in FIGS. 10 and 11, the manipulator 11 can be replaced by other devices. For example, of a DIP switch 39 of digital setting part as shown in FIG. 12. Also, it is possible to install a DIP switch 39 in a frequency receiving mechanism 50 containing a receiver circuit 38 as shown in FIG. 13.

The effects which are obtained from embodiments of the present invention will be described as follows:

I. A simple device source for a motorized antenna apparatus can be obtained. Because that the controller and the antenna driving mechanism are fabricated and installed individually and separately, a construction of the antenna driving mechanism is made simple and also that of the motorized antenna is simplified. Consequently, instead of the conventional manually operated change switch of motorized antenna in a car interior, the present invention uses a simplified construction of the antenna driving mechanism.

II. The controller can be installed in a car or motor vehicle interior. According to the present invention, the controller can be fixed around a driver's seat, for example, on a dashboard to which the driver can reach for the controller. Thus, there is little chance of the controller to be affected by rain and other enviromental conditions. Additionally, the controller is not affected by outside noise or by the electric system in the automobile.

III. Various length of the antenna suitable to the various receiving condition can be used. According to the present invention, the control apparatus for the motorized antenna uses a rotary switch and the position of the movable contactor on the rotary switch can be set easily by operation of the manipulator. As a result, the particular antenna length suitable to particular frequencies of AM, FM and TV can be obtained without difficult. When the control apparatus is used for a multi-frequency common-use antenna, particular frequency can be easily obtained.

IV. Reviewing of signals can be attained in the strong or the weak electric fields.

Because that the present motorized antenna can attain any length of the antenna as described above, suitable and preferable receiving can be accomplished where these are in strong or weak electric fields.

V. The operation of the controlling mechanism is not effected by any trouble or malfunctioning of the antenna, low temperature condition, and pulsation of the voltage source.

According to the present invention, the motor 4 for antenna driving is separated from another motor 14 for driving the controller. Accordingly, motor 14 is effected by some abnormal loading, such as troubles causing malfunction, or freezing of the antenna. In the prior art, when the abnormal loading is affected as mentioned above, a limit switch functions resulting in burning of the motor. According to the present invention, a limit switch doesn't function in the condition above and as a result, the motor doesn't burn.

The controller driving motor functions at smaller load and smaller current than the antenna driving motor, so that the controller driving motor can function by half the power of a car battery of DC 12 V. In a cold area, the switching operation of the controlling mechanism can be attained effectively.

VI. Having good resetting function.

In the prior art, when the antenna elements or rods are frozen, they cannot rise or go down at the half-way position. When such a fixed condition of the antenna rods happens it has been difficult to restore the normal operating condition.

In the present invention, when the controller is positioned at the full extension position after the cause of malfunctioning is solved, the next operation of the radio power switch (OFF when the antenna stops at half raising after ON operation, or ON when it stops at half descending after OFF operation) automatically. Operates the controller for raising or lowering the antenna to its raised or lowered position.

When the antenna is intended to go up or down automatically to its half or intermediate position and the above-mentioned malfunctioning has happened, the controller is set to its full extension position (reset position) to function a reciprocation of the antenna and to restore it to its normal condition. After the resetting operation above, any intermediate position of the antenna can be freely set by resetting it.

VII. Alternations of power voltage and motor characteristics are coped with effectively.

Because a supplemental circuit has a variable resistor 25, it is possible to suitably regulate and set a timing of the switch operation of the controller so as to correspond to the operating time of the antenna and synchronize the antenna drive motor with the controller drive motor and freely correspond to power voltage alteration and characteristic change of any commercial motor due to the change of weather.

In the conventional charge and discharge timer provided with condensers and resistors, it is apt to change the operation time of raising and downing antenna due to voltage alteration and temperature change (when low voltage uncomplete extension and constraction happens, and when high voltage over clutch operation happens). According to the present invention, the operation time of antenna is always stable.

VIII. Antenna always contracts completely.

In the conventional antenna automatic extension and contraction mechanism, due to particular characteristics of the antenna drive motor, lowering or raising of the antenna, and operation gap in the clutch mechanism, some difference is generated between the raising and the lowering times of antenna. Consequently, the control switch is turned OFF before the antenna is fully contracted.

According to the present invention, the supplemental circuit regulates the operating times of the antenna drive motor and the controller mechanism drive motor to lengthen in general the downing time than raising time by about 0.2–0.5 second to solve the problem above.

IX. Clutch mechanism can be operated suitably.

In the present invention, after that the supplemental circuit selects strictly the time the antenna needs to complete the raising of antenna and the time in which the controller operates, the controller operates the motorized antenna without noise of clutching. It may be possible to generate some clutching sound making the operator known of the completion situation.

We claim:

1. A mechanism for controlling an electrically driven antenna comprising;

a transmitting and receiving circuit;

an antenna motor power supply circuit operatively connected in parallel with the transmitting and receiving circuit;

independent contactor control means including a rotary contactor with a motor, for responding to control commands, given by a manipulating portion;

the manipulating portion for giving the control commands to said independent contactor control means, said manipulating portions adapted to preset selected amounts of antenna extension and contraction in said independent contactor control means; and a changeover means for performing ON/OFF operations for current supply to the antenna motor power supply circuit, the motor of the independent contactor control means and the transmitting and receiving circuit, so as to extend and contract the antenna according to the control commands.

2. A mechanism for controlling an electrically driven antenna comprising:

a transmitting and receiving circuit;

an antenna motor power supply circuit operatively connected in parallel with said transmitting and receiving circuit;

independent control means for responding to commands, located in a case which includes a rotatable switch plate and a motor for rotating the switch plate, said control means having a rotary contactor connected to the antenna motor power supply circuit;

a movable manipulating portion for operating the switch plate from outside the case; and changeover means for performing an ON/OFF operation of the antenna motor power supply circuit, the independent control means motor and the operation of the transmitting and receiving circuit, so as to extend and contract the antenna according to a control command.

3. A mechanism for controlling an electrically driven antenna comprising:

a transmitting and receiving circuit;

an antenna motor power supply circuit operatively connected in parallel with the transmitting and receiving circuit;

control means for responding to commands, including a rotary contactor connected to the antenna motor power supply circuit and a rotatable switch plate in a case, said switch plate having a fixed contact, first and second movable contacts;

said first movable contact connected to a power switch of the transmitting and receiving circuit;

said second movable contact connected to one pole of a supply power source through a changeover switch of a relay;

said fixed contact connected to said supply power source; and a manipulator located outside the case for operating at least one of said movable contacts.

4. A mechanism for controlling an electrically driven antenna comprising:

a transmitting and receiving circuit;

an antenna motor power circuit operatively connected in parallel with the transmitting and receiving circuit;

independent control means for responding to control commands from a manipulating portion, including a rotary contactor and a motor for rotating the rotary contactor, said independent control means located in the antenna motor power circuit;

the manipulating portion for giving the control commands to said independent control means and adapted to preset selected values of antenna extension and contraction in said independent control means;

said independent control means including a motor circuit having a variable resistor; and a changeover means for performing ON/OFF operations of a current supply to the antenna motor power circuit, the motor for the independent control means together with the ON/OFF operation of the transmitting and receiving circuit, so as to extend and contract the antenna according to the control commands.

5. A mechanism for controlling an electrically driven antenna comprising:

a transmitting and receiving circuit;

an antenna motor power circuit operatively connected in parallel with the transmitting and receiving circuit;

independent control means for responding to control commands, including a drive motor and a power supply circuit for the drive motor;

a supplemental circuit in the independent control means drive motor power supply circuit including a resistor operatively connected in parallel to a diode;

said independent control means drive motor being driven by power supplied through the diode during extension of the antenna;

said independent control means drive motor being driven by power supplied through the resistor during contraction of the antenna, so that the power during the antenna contraction is smaller than the power during the antenna extension; and changeover means for performing ON/OFF operations of current to the antenna motor power circuit and the independent control means drive motor, together with an ON/OFF operation of the transmitting and receiving circuit, so as to extend and contract the antenna according to the control commands.

6. A mechanism for controlling an electrically driven antenna as claimed in claim 5 wherein:

said resistor is a variable resistor which can quickly respond to every voltage variation due to particular motor characteristics, power source voltage and temperature change and to variable clutch operating conditions from non-clutch operating conditions.

7. A mechanism for controlling an electrically driven antenna comprising:

an antenna motor;

a power source;

a transmitting and receiving mechanism, responsive to a control means;

a control circuit for said control means operatively connected to said antenna motor and said power source;

an A/D data memory operatively connected to said control circuit;

a comparator operatively connected to the control circuit;

a memory circuit for the antenna's present position operatively connected to the control circuit; and a DIP switch for functioning as a manipulating portion operatively connected to said control circuit.

* * * * *